United States Patent
Li et al.

(10) Patent No.: US 8,169,885 B2
(45) Date of Patent: May 1, 2012

(54) METHOD AND APPARATUS FOR OPTIMIZATION OF WIRELESS MESH NETWORKS

(75) Inventors: Kai Li, New York, NY (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 991 days.

(21) Appl. No.: 11/999,226

(22) Filed: Dec. 4, 2007

(65) Prior Publication Data

US 2008/0130521 A1    Jun. 5, 2008

Related U.S. Application Data

(60) Provisional application No. 60/868,418, filed on Dec. 4, 2006.

(51) Int. Cl.
  *H04J 11/00* (2006.01)
(52) U.S. Cl. ........................................ 370/203
(58) Field of Classification Search .......... 370/338, 370/339, 203, 237, 238, 238.1, 252
  See application file for complete search history.

(56) References Cited

U.S. PATENT DOCUMENTS

| 7,339,897 | B2 * | 3/2008 | Larsson et al. ............ 370/252 |
| 2007/0110292 | A1 * | 5/2007 | Bi et al. ................. 382/128 |

OTHER PUBLICATIONS

Characterizing the capacity region in multi-radio multi-channel wireless mesh network by Murali et al. Publish Sep. 2005.*
M. Alicherry, et al., "Joint Channel Assignment and Routing for Throughput Optimization in Multi-radio Wireless Mesh Networks", MobiCom'05,2005, pp. 58-72.
R. Ahlswede, et al., "Network Information Flow", IEEE Trans. Inform. Theory, 46(4), Jul. 2000, pp. 1204-1216.
Al Hamra, et al., "Network Coding for Wireless Mesh Networks: A Case Study", IEEE Int'l Symp. on a World of Wireless,Mobile and Multimedia Networks, 2006 pp. 103-114.
T. Ho, et al., "Online Incremental Network Coding for Multiple Unicasts", In Proc. DIMACS Working Group on Network Coding, 2005, pp. 1-14.
M. Johansson, et al., "Cross-Layer Optimization of Wireless Networks Using Nonlinear Column Generation", IEEE Trans. on Wireless Communication, 5(2), Feb. 2006, pp. 435-445.

* cited by examiner

*Primary Examiner* — Huy Vu
*Assistant Examiner* — Dady Chery
(74) *Attorney, Agent, or Firm* — Joseph Kolodka

(57) ABSTRACT

A cross-layer optimization framework for designing of multi-radio/multi-channel wireless mesh networks with network coding to support multiple unicast applications is used. A column-generation-based primal-dual method is used to solve the optimization problem. For network-layer formation, a code construction scheme based on linear programming is used. Delay constraints are imposed on the network code construction so the possible impact of the extra decoding delay to the upper-layer Transmission Control Protocol/Internet Protocol (TCP/IP) performance may be reduced without changing the upper-layer protocols.

3 Claims, 4 Drawing Sheets

US 8,169,885 B2

METHOD AND APPARATUS FOR OPTIMIZATION OF WIRELESS MESH NETWORKS

This application claims the benefit of U.S. Provisional Application No. 60/868,418 filed on Dec. 4, 2006, which is incorporated herein by reference.

BACKGROUND OF THE INVENTION

The present invention is related generally to wireless networks, and in particular, to throughput optimization in wireless mesh networks.

A wireless mesh network is a mesh network implemented over a wireless network system such as wireless local area network (LAN). As such, wireless mesh networks have been considered as a practical wireless solution for providing community broadband internet access service and other wireless services. In some cases, nodes (e.g., transmitters) in wireless mesh networks may be equipped with multiple radios (e.g., multiple sources) and may be capable of transmitting over multiple orthogonal channels simultaneously.

For a traditional network, each intermediate node forwards received information to the next node (e.g., the next hop). This method of forwarding information is inefficient and occupies excessive capacity. While transmission may occur over multiple channels in such networks, the resources of wireless mesh networks are finite and it is difficult to efficiently utilize the wireless resources.

Therefore, there remains a need to improve throughput in wireless mesh networks.

BRIEF SUMMARY OF THE INVENTION

The present invention is generally directed to designing a wireless mesh network. The wireless mesh network may have a plurality of transmission sources and a plurality of nodes connected by a plurality of links. The design of the network may include optimizing the throughput by determining an optimization problem describing the wireless mesh network. Associated constraints for the optimization problem may be determined as well as a network code for the wireless mesh network. The network code may be designed by solving the optimization problem using a column-based primal-dual optimization method.

These and other advantages of the invention will be apparent to those of ordinary skill in the art by reference to the following detailed description and the accompanying drawings.

DETAILED DESCRIPTION

The present invention is generally directed to a cross-layer method for designing and optimizing multi-radio/multi-channel wireless mesh networks with network coding to support multiple unicast applications. In designing a wireless mesh network, the network constraints are represented as an optimization problem. A column-generation-based primal-dual method is used to solve this optimization problem, taking into account the broadcasting features of wireless networks.

Optimization of the wireless mesh network may include designing a network code for transmission of information among the nodes of the network. Thus, optimization may allow full realization of the theoretical gains of network coding. For network-layer formation, a code construction scheme based on linear programming is used. In this way, the network coding plus media access control (MAC) gain may be significantly increased. Delay constraints are imposed on the network code construction so the possible impact of the extra decoding delay to the upper-layer Transmission Control Protocol/Internet Protocol (TCP/IP) performance may be reduced without changing the upper-layer protocols.

In practical application, the methods described herein may be used to design a wireless mesh network with multiple transmission sources (e.g., multiple antennas, base stations, etc.). The additional transmission sources may improve network throughput. Though this may increase complexity in decoding downstream (e.g., at receivers, nodes, drains, etc.), the network coding described herein may account for this complexity (e.g., by discounting solutions which introduce decoding delay) so that there is no significant increase in decoding time. Thus, the overall transmission speed of the wireless mesh network may be increased.

Figure 1:
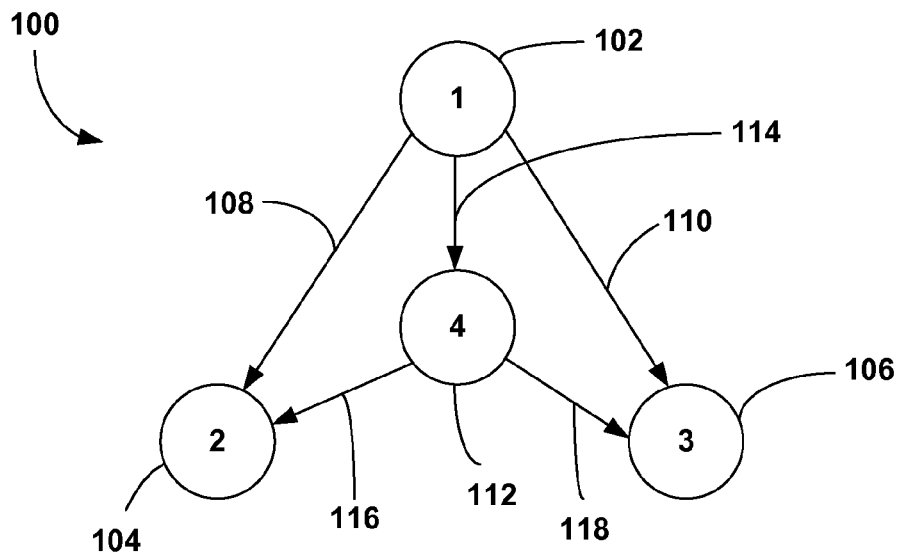
FIG. 1 depicts an exemplary network according to an embodiment of the present invention.
Figure 2:
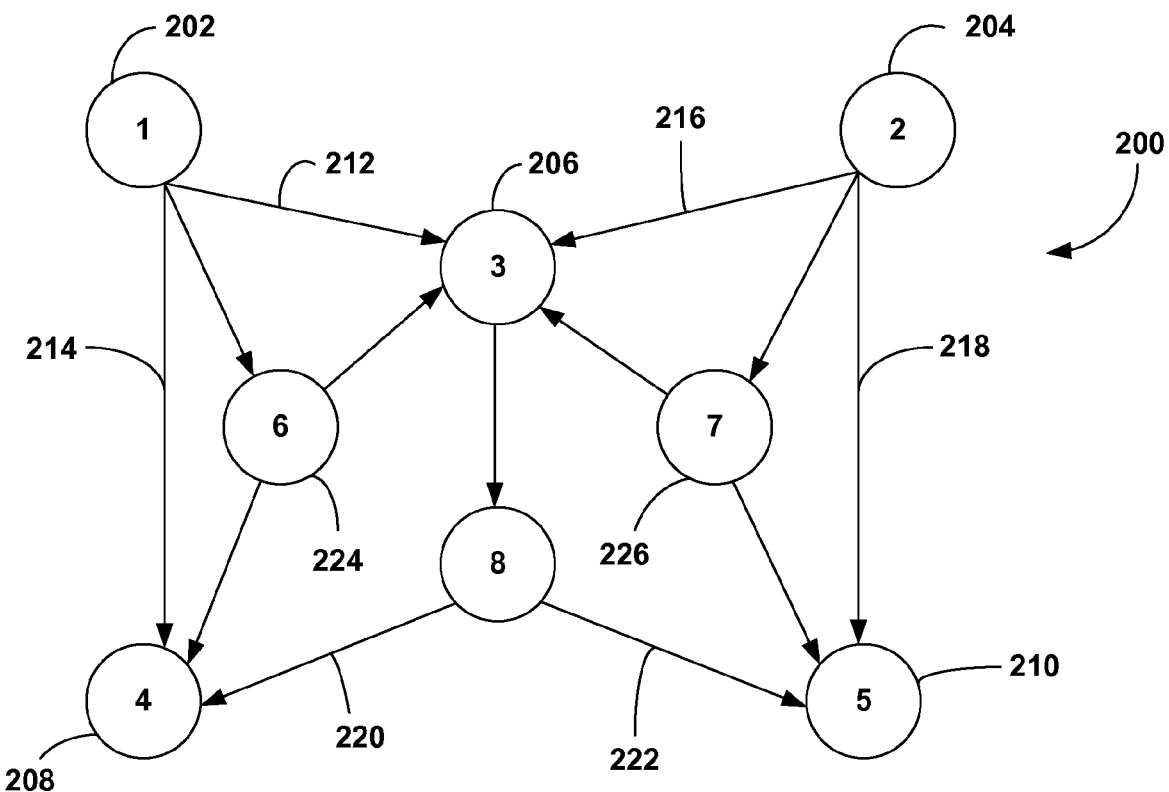
FIG. 2 depicts an exemplary network according to an embodiment of the present invention.

FIGS. 1 and 2 depict exemplary wireless mesh networks featuring pseudo-broadcasting according to embodiments of the present invention. Such exemplary networks provide a framework for understand the optimization methods described herein and the present invention is not limited to only these network types and/or arrangements.

FIG. 1 depicts an exemplary network 100. Network 100 includes multiple physical nodes 102, 104, and 106. Though depicted in FIG. 1 as a network 100 having three physical nodes 102-106, any number of physical nodes may be employed.

Network 100 may be a wireless mesh network as is known. In an alternative embodiment, network 100 may be a portion of a wireless network (e.g., a source and two drains of a wireless mesh network, etc.). In at least one embodiment of the present invention, network 100 may be designed and/or optimized according to the methods described herein. In some embodiments, network 100 may be a multi-radio, multi-channel wireless mesh network. To facilitate such a network, physical nodes 102-106 may communicate via one or more radios, network interface cards (NICs), and/or other communication devices (not shown) able to access multiple orthogonal channels simultaneously. As such, physical nodes 102-106 may communicate (e.g., transmit information) by multiple independent point-to-point transmissions (e.g., multiple unicast). These transmissions may be made over one or more links, which may be any means of connecting one location (e.g., node) to another for the purpose of transmitting and receiving data as is known.

In the exemplary network 100, physical node 102 is also referred to as Node 1 (e.g., $N_1$) and/or Source 1 (e.g., $s_1$) and is capable of simultaneous multiple unicast transmission to physical node 104, also referred to as Node 2 (e.g., $N_2$) and/or Drain 1 (e.g., $d_1$), via link 108, also referred to as Link 1 (e.g., $\epsilon_1$). Link 1 and other links described herein may be data links such as wireless communication channels or the like. Similarly, physical node 102 is capable of simultaneous multiple unicast transmission to physical node 106, also referred to as Node 3 (e.g., $N_3$) and/or Drain 2 (e.g., $d_2$), via link 110, also referred to as Link 2 (e.g., $\epsilon_2$). Of course, since network 100 may have any number of nodes and any number of corresponding links, nodes may be labeled N={1, 2, ..., N} and links may be labeled $\epsilon$={1, 2, ..., L}. Accordingly, a directed graph G=(N, $\epsilon$) may be used to model network 100.

Network 100, as a multi-radio network, may have a radio distribution vector $$I \triangleq \{I_i\}_{i=1}^N$$

where $I_i$ indicates the available radio number at the $i^{th}$ node. The topology of network 100 may be represented by an N×L indicator matrix $\underline{D}$, such that $$\underline{D}(n, l) = \begin{cases} 1, & \text{if the } n^{th} \text{ node is the start node of the } l^{th} \text{ link,} \\ -1, & \text{if the } n^{th} \text{ node is the end node of the } l^{th} \text{ link,} \\ 0, & \text{otherwise.} \end{cases}$$

To illustrate the multiple unicast methods of transmission, connection, and communication, network 100 may be described as featuring pseudo-broadcasting. That is, network 100 may be thought of as having a virtual node 112. Virtual node 112 is not a node in the same way that physical nodes 102-106 are nodes; virtual node 112 does not have a physical structure, but is used herein to help model the network 100. For purposes of illustration and simplicity, virtual node 112 is described hereafter as if it is a physical node capable of sending and/or receiving transmissions in the same manner as physical nodes 102-106.

Virtual node 112 may have links to one or more physical nodes 102-106. In network 100, virtual node 112 may be referred to as Node 4 (e.g., $N_4$) and may receive transmissions from physical node 102 over link 114 (e.g., $\epsilon_3$). Similarly, virtual node 112 may transmit information to physical nodes 104 and 106 over link 116 (e.g., $\epsilon_4$) and link 118 (e.g., $\epsilon_5$), respectively.

FIG. 2 depicts an exemplary network 200. Network 200 includes multiple physical nodes 202, 204, 206, 208, and 210. Similarly to network 100 of FIG. 1, though depicted in FIG. 2 as a network 200 having five physical nodes 202-210, any number of physical nodes may be employed.

Network 200 may be a wireless mesh network as is known. In an alternative embodiment, network 200 may be a portion of a wireless network (e.g., multiple sources and multiple drains of a wireless mesh network, etc.). In at least one embodiment of the present invention, network 100 may be designed and/or optimized according to the methods described herein. In some embodiments, network 200 may be a multi-radio, multi-channel wireless mesh network or another type of broadcast network. To facilitate such a network, physical nodes 202-210 may communicate via one or more radios, network interface cards (NICs), and/or other communication devices (not shown) able to access multiple orthogonal channels simultaneously. As such, physical nodes 202-210 may communicate (e.g., transmit information) by multiple independent point-to-point transmissions (e.g., multiple unicast).

In the exemplary network 200, physical node 202 is also referred to as Node 1 (e.g., $N_1$) and/or Source 1 (e.g., $s_1$) and is capable of simultaneous multiple unicast transmission to intermediate (e.g., relay) physical node 206, also referred to as Node 3 (e.g., $N_3$), via link 212, also referred to as Link 1 (e.g., $\epsilon_1$). Physical node 202 may also be configured to transmit to physical node 208, also referred to as Node 4 (e.g., $N_4$) and/or Drain 2 (e.g., $d_2$), via link 214, also referred to as Link 2 (e.g., $\epsilon_2$). Similarly, physical node 204 is capable of simultaneous multiple unicast transmission to intermediate physical node 206 via link 216, also referred to as Link 3 (e.g., $\epsilon_3$). Physical node 204 may also be configured to transmit to physical node 210, also referred to as Node 5 (e.g., $N_5$) and/or Drain 1 (e.g., $d_1$), via link 218, also referred to as Link 4 (e.g., $\epsilon_4$). Intermediate physical node may be configured to relay transmissions received from physical nodes 202 and 204 and/or transmit the same and/or other information to physical nodes 208 and 210 via links 220 (e.g., $\epsilon_5$) and 222 (e.g., $\epsilon_6$), respectively. As will be discussed further below, intermediate physical node 206 may be further configured to code and/or otherwise alter transmissions received from physical nodes 202 and 204 as appropriate.

Of course, since network 200 may have any number of nodes and any number of corresponding links, nodes may be labeled N={1, 2, ..., N} and links may be labeled $\epsilon$={1, 2, ..., L}. Accordingly, a directed graph G=(N, $\epsilon$) may be used to model network 200 as described above with respect to network 100.

Similar to network 100, network 200 may be thought of as having virtual nodes 224 (e.g., $N_6$), 226 (e.g., $N_7$), and 228 (e.g., $N_8$). In a similar manner, physical node 202 may "transmit" to virtual node 224, which may, in turn, "transmit" to intermediate physical node 206 and/or physical node 208 over corresponding links. Physical node 204 may "transmit" to virtual node 226, which may, in turn, "transmit" to intermediate physical node 206 and/or physical node 210. These transmissions may also be over one or more corresponding links (e.g., data links). In the same way, intermediate physical node 206 may "transmit" information to physical nodes 208 and 210 by way of virtual node 228 and another set of corresponding links. One of skill in the art will recognize the particular means of communication between the physical nodes and the various network arrangements (e.g., butterfly, X, etc.) which may be employed. Accordingly, these issues will not be discussed in further detail herein.

Using the concept of virtual nodes as described in relation to FIGS. 1 and 2, the directed graph G may be extended to G'=(N', $\epsilon$'), where N'={1, 2, ..., N, N+1, ..., N'} and $\epsilon$'={1, 2, ..., L, L+1, ..., L'}, with {N+1, ..., N'} and {L+1, ..., L'} representing the virtual nodes and corresponding links, respectively. Accordingly, the network topology matrix D' is an N'×L' indicator matrix with the upper-left N×L elements identical to $\underline{D}$. Similarly, radio distribution vector I' may be formed as above. Since the virtual nodes (e.g., virtual nodes 112, 224-228, etc.) do not need actual NICs and/or other hardware to create wireless connections (e.g., links 114-118, 212-222, etc.), $\{I_i=0\}_{i=N+1}^{N'}$ and the network capacity region is a function of I. Hereinafter, G denotes the original network (e.g., networks 100 or 200 without virtual nodes 112 or 224-228), and G' denotes the extended network with pseudo-broadcasting enabled (e.g., networks 100 and 200 with virtual nodes 112 and 224-228).

Figure 3:
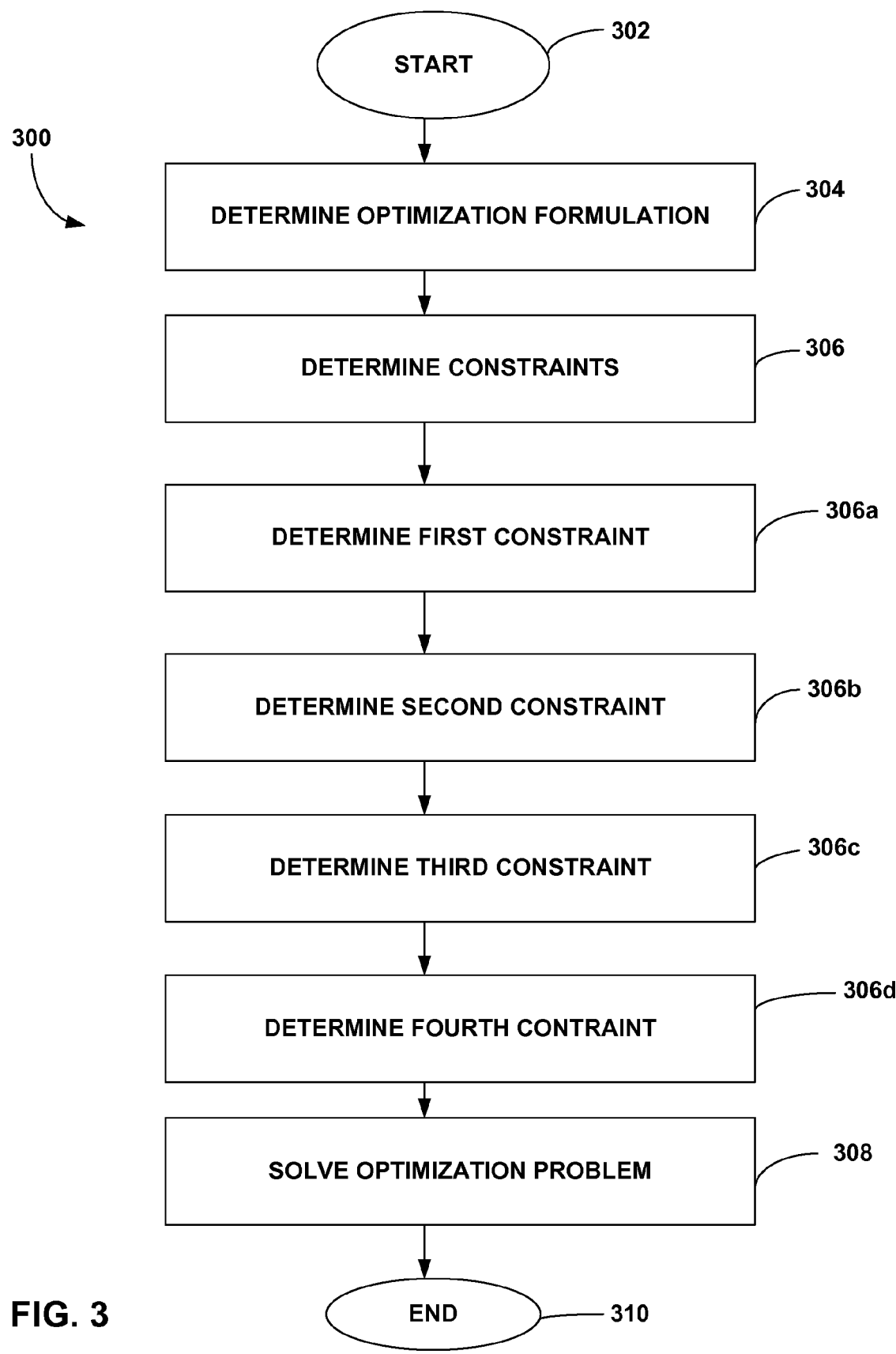
FIG. 3 depicts a flowchart of a method of optimizing throughput in a network.

FIG. 3 depicts a flowchart of a method 300 of optimizing throughput in a network. The throughput of the network (e.g., network 200) may be an amount of data (e.g., digital data) per unit time delivered over a physical or logical link (e.g., over links 212-222) or that is passing through a network node (e.g., physical nodes 202-210). In at least one embodiment, the network to be optimized may be similar to wireless mesh networks 100 and/or 200. The method begins at step 302.

In step 304, an optimization problem for the throughput of the network is determined. The optimization problem may be a linear optimization problem describing the network being optimized. For example, as discussed above, multiple unicast transmissions may be made over network 100. Assuming there are S independent data sessions in the network, $s_i$ is the source node (e.g., physical node 102) and $d_i$ is the destination node (e.g., physical node 104 or 106) in the $i^{th}$ unicast session. Let $\underline{R} = \{R_i\}_{i=1}^T$ be the unicast data rates for T sessions. Denote $f_l$ as the aggregated flow rate over the $l^{th}$ link ($1 \leq l \leq L'$). Given R, F(R) is the set containing all possible network flow rates that can support R. Let C(l) be the set containing all achievable rates $\underline{c} = \{c_l\}_{l=1}^{L'}$ that the physical layer can support on links $l \in \underline{e'}$. $\overline{C}(\underline{l})$ is a function of the radio distribution vector (l) discussed above with respect to FIGS. 1 and 2. Thus, the network optimization problem can then be formulated as:
maxU(R,f)s.t.f∈F(R); $r_i \geq 0$, ∀i; c∈C(l); $f_l \leq c_l$, ∀l where U(R, f) is a utility function. In some embodiments, the utility function is assumed to be concave.

In step 306, the constraints of the optimization problem determined in step 304 are determined. In the embodiment of the present invention shown in step 304, four constraints are used. These constraints are described in substeps 306a-d.

In substep 306a, the first constraint is determined. The first constraint f∈F(R) enforces the dependence between the achievable rates R and the data flows f. In substep 306b, the second constraint is determined. The second constraint $r_i \geq 0$, ∀i is that data rate (e.g., the data transmission rate, etc.). In substep 306c, the third constraint is determined. The third constraint c∈C(l) indicates the relationship between the achievable link capacity c and radio allocation along with the resource allocation, scheduling, and data routing schemes. In substep 306d, the fourth constraint is determined. The fourth constraint $f_l \leq c_l$, ∀l bounds the sum of the flow rate on each link by the link capacity. For the sake of notational simplicity, the index l in C(l) is omitted hereinafter.

When maximizing the total throughput is the design target (e.g., the resultant of the optimization formulation in method step 304), the network optimization problem max U(R,f)s.t. f∈F(R); $r_i \geq 0$, ∀i; c∈C(l); $f_l \leq c_l$, ∀l can be defined as the sum of the data rates in all sessions $$U(\underline{R}, \underline{f}) \triangleq \sum_{i=1}^{T} R_i.$$

Alternatively, in case fairness needs to be taken into account, the minimum end-to-end communication rates may be maximized by letting $$U(\underline{R}, \underline{f}) \triangleq \min\{R_i\},$$

which may be transformed to an equivalent linear formulation. That is, all users (e.g., sources, drains, nodes, etc.) should realize throughput gain (e.g., a higher rate) in the newly designed network. Accordingly, the rate at each node is taken into account instead of the sum rate of the system.

In step 308, the optimization problem is solved. In at least one embodiment of the invention, the optimization problem is solved using a primal-dual approach with column generation. Such an approach will be described in further detail below with respect to FIG. 4. The method ends at step 310.

Figure 4:
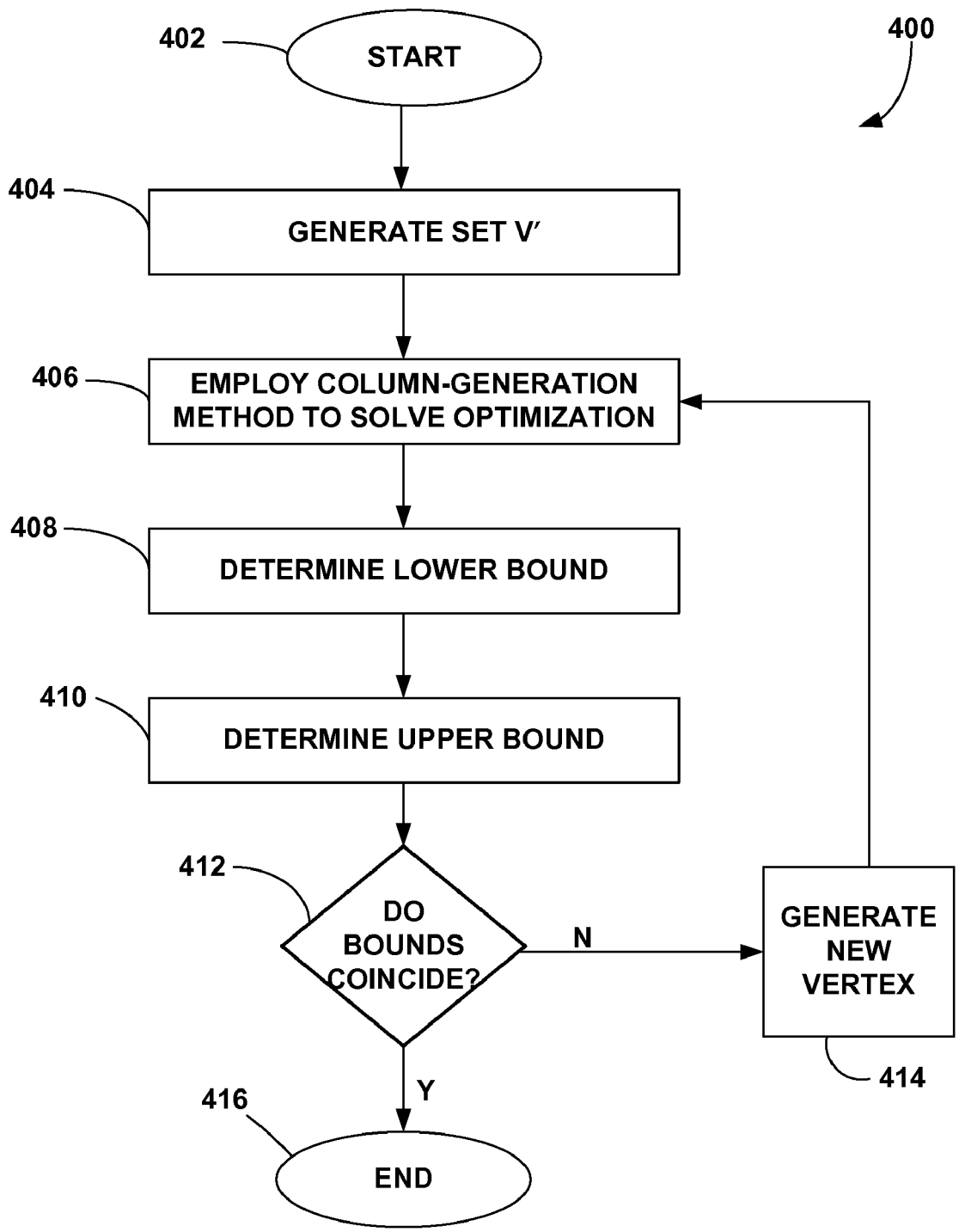
FIG. 4 depicts a flowchart of a method 400 of solving an optimization problem.

FIG. 4 depicts a flowchart of a method 400 of solving an optimization problem as in method 300. The method 400 may be a primal-dual method with column generation. In other embodiments, other methods of solving the optimization problem (e.g., designing and/or optimizing the network) may be used. The method begins at step 402.

In step 404, a set V' containing several feasible link rates $c_k$ is generated. In at least one embodiment, there are K feasible link capacity vectors such that $V' = \{\underline{c}_k \in C\}_{k=1}^{K}$.

The set F(R) and C in
maxU(R,f)s.t.f∈F(R); $r_i \geq 0$, ∀i; c∈C(l); $f_l \leq c_l$, ∀l are determined by the specific network and physical-layer model (e.g., as in networks 100 and 200 of FIGS. 1 and 2). Since time-sharing is enabled, C is a convex set. In time sharing, multiple solutions may be applied at multiple times. For example, for a duration $T = T_1 + T_2$, $T_1$ will have a first solution and $T_2$ will have a second solution. Thus, for time T, the realized solution will have a ration of $T_1/T_2$.

Therefore, F(R) is also convex if data routing is assumed to be based on the multicommodity flow model or routing with linear network coding, as described below.

These two constraints are coupled only through the constraints $f_l \leq c_l$, ∀l. Thus the optimization problem of method step 304 is a convex optimization problem. Since C is a convex hull, it is fully determined by its vertices. However, since joint resource allocation and scheduling are considered, C may be too complex to be described for a wireless network.

In step 406, the column-generation method is employed to solve the optimization problem. Instead of trying to exactly describe the convex hull C, another convex hull $C' \subset C$ is employed to approximate C. The corresponding convex hull $$C' = \left\{ \underline{c} | \underline{c} = \sum_{k=1}^{K} \alpha_k \underline{c}_k, \text{ s.t.} \sum_{k=1}^{K} \alpha_k = 1, \alpha_k \geq 0, \forall k \right\}$$

is fully characterized by the set V' of step 404. The original linear programming problem is then transformed to the following problem:

$$\max U\{\underline{R}, \underline{f}\}, \text{ s.t. } \underline{f} \in F(\underline{R}); r_i \geq 0, \forall i;$$

$$\underline{c} = \sum_{k=1}^{K} \alpha_k \underline{c}_k; \sum_{k=1}^{K} \alpha_k = 1; f_l \leq c_l, \forall l; a_k \geq 0, \forall k.$$

This is referred to as the restricted primal problem.

In step 408, the lower bound $U_{lower}$ and the dual factors $\{\lambda_l\}_{l=1}^{L'}$ are determined. Since C'∈C, the solution to the restricted primal problem provides a lower bound $U_{lower}(l)$ for the optimization problem of method 300.

Similarly, in step 410, the upper bound $U_{uppper}$ and a new vertex is determined. The upper bound of the optimization problem of method 300 may be determined by considering the dual of the original problem given by:

$$\max_{r_i \geq 0, \forall i} \left\{ U(\underline{R}, \underline{f}) - \sum_{l=1}^{L'} \lambda_l f_l \middle| \underline{f} \in F(\underline{R}) \right\} + \max_{\underline{c} \in C} \sum_{l=1}^{L'} \lambda_l c_l,$$

where the dual factors $\{\lambda_l\}_{l=1}^{L'}$ are the corresponding Lagrangian multipliers associated with the constraints about $\{c_l\}$ in the optimization problem of method 300.

In step 412, a check is performed to determine if the upper and lower bounds coincide. If they coincide, an optimal solution has been reached and the method ends at step 416. If the upper and lower bounds do not coincide, the method passes to step 414.

In steps 406 and 408, a lower bound and an upper bound of the original optimization are determined and the gap between the two bounds indicates the accuracy of the current solution. In case that the two bounds coincide, the optimal solution to the optimization problem of method 300 is obtained and the method ends at step 416.

If they are different, a new vertex is generated in step 414. The new vertex is generated by solving the problem $$\max_{\underline{c} \in C} \sum_{l=1}^{L'} \lambda_l c_l$$

into the subset V'. The method 400 then returns control to step 406 and new upper and lower bounds are determined. The iteration will continue until the gap between the two bounds is smaller than a predetermined threshold n.

The optimal solution may be referred to as $\{\underline{r}^*, \underline{f}^*\}$. If the optimization problem is a linear programming, the strong duality holds. That is, the optimal primal solution coincides with its dual solution, and $$\max_{r_i \geq 0, \forall i} \left\{ U(\underline{R}, \underline{f}) - \sum_{l=1}^{L'} \lambda_l f_l \middle| \underline{f} \in F(\underline{R}) \right\} = U(\underline{R}^*, \underline{f}^*) - \sum_{l=1}^{L'} \lambda_l f_l^*.$$

Accordingly, the upper bound may be efficiently solved using only $$\max_{\underline{c} \in C} \sum_{l=1}^{L'} \lambda_l c_l.$$

The network optimization described with respect to FIGS. 3 and 4 may be enhanced by using network coding. That is, the optimization problem (e.g., the design and/or description of the network) may be further constrained so as to introduce a network code (e.g., a code for transmission of data in the network). Generally, in a linear network coding problem, a group of nodes are used to move data from one or more source nodes to one or more sink nodes. Each node generates a new packet that is a linear combination of the earlier received packets at that node. In embodiments of the present invention multiple unicast networks such as networks 100 and 200 of FIGS. 1 and 2 may use network coding (e.g., a designed network code) in their respective designs.

Linear programming methods in wireless mesh networks may be used in network code construction according to embodiments of the present invention, especially in conjunction with the optimization in step 304 of method 300. For simplicity of presentation, the following discussion focuses on network coding over GF(2) (e.g., the Galois field (finite field) of two elements), where simple binary exclusive disjunction (e.g., XOR) operation is employed for network encoding and/or decoding.

For a given node $n \in N'$, $l(n)$ indicates the set of edges whose end node is n and $O(n)$ indicates the set of edges whose start node is n. $x_l^i$ is the flow rate of the $i^{th}$ session over the $l^{th}$ link and the aggregate load on the $l^{th}$ link is given by $$f_l = \sum_{i=1}^{T} x_l^i$$

if no network coding is considered. The T unicast triples $(s_i, d_i, R_i)$ for $i=1, 2, \ldots, T$ are feasible with routing if the following conditions hold:

$$\sum_{i=1}^{T} x_l^i \leq c_l, \, x_l^i = f_l \geq 0, \text{ and } \sum_{l \in O(n)} x_l^i - \sum_{l \in I(n)} x_l^i = \begin{cases} R_i, & \text{if } n = s_i, \\ -R_i, & \text{if } n = d_i, \\ 0, & \text{otherwise,} \end{cases}$$

where $\underline{c} = \{c_l\}_{l=1}^{L'}$ are the achievable rates that the physical layer (e.g., in the OSI model) can support on links $l \in \epsilon'$. However, when network coding is permitted, the actual aggregate load over a particular link l is no longer the sum of $\{x_l^i\}_{i=1}^{T}$ and $$\sum_{i=1}^{T} x_l^i \leq c_l,$$

$x_l^i = f_l \geq 0$ should be modified to reflect the effect of network coding. What is more, in order to ensure that a network coding scheme is decodable, extra variables and conditions should be introduced based on the following poison-antidote concept.

Referring back to FIG. 2, data may be transmitted from source nodes 202 and 204. Physical node 202 (e.g., source 1) may transmit data $b_1$. Similarly, physical node 204 (e.g., source 2) may transmit data $b_2$. Thus, in a network coding scheme, data transmitted from node 206 is $b_1 \oplus b_2$ and knowledge of $b_2$ is needed at $d_1$ (e.g., physical node 210) in order to recover $b_1$. The transmission of $b_1 \oplus b_2$ is referred to as "poisoning" of the two flows and the transmission of $b_2$ from physical node 204 to physical node 210 is interpreted as an "antidote." Similarly, transmission of $b_1$ from physical node 202 to physical node 208 is also interpreted as an "antidote." Accordingly, an "antidote request" notifies node 202 (and similarly 204) of the poisoned downstream and requests an antidote $b_1$ (similarly $b_2$) for $d_2$ (similarly $d_1$).

Linear programming formulation for use in optimization of the throughput of the network may be based on a similar poison-antidote approach where the possible network coding+MAC gain depends upon the network topology and can be unbounded. That is, in order to ensure that a given set of rates (e.g., the candidate rates) can be supported by the network, a set of linear constraints are supplied.

A wireless network $G'=(V', \epsilon')$ is used with pseudo-broadcasting as described above in networks 100 and 200. A source set is defined as $$S \triangleq \{s_1, s_2, \ldots, s_T\},$$

where $s_i \epsilon N$. A network coding event is defined as $$u \triangleq (n_u, S_u),$$

with $n_u \epsilon N'$ being the node where binary XOR encoding is performed (e.g., at intermediate node 206 in network 200) and $S_u \subset S$ being the set of sources that are involved in this network coding event. For instance, in the exemplary network 200 of FIG. 2, a network coding may be initialized at node 206 which involves source $s_1$ and $s_2$ (e.g., nodes 202 and 204). In other words, the encoder is $b_1 \oplus b_2$ with $b_1$ and $b_2$ being the bits from $s_1$ and $s_2$, respectively, and the network coding event is specified by u=(node 204, $\{s_1, s_2\}$). A network may contain multiple coding events and these events may form a network coding event set represented by $U=\{u_k\}$.

Sufficient conditions (e.g., linear constraints) for the existence of a network coding solution involving routing, duplicating, pseudo-broadcasting, and bit-level XOR are considered. That is, when these constraints are satisfied, the solution corresponds to a valid network coding solution. In order to do so, a number of variables are introduced. Given a particular coding event $u=(n_u, S_u)$, let $i \epsilon S_u$. Also, $p_l(i,u)$, $\{q_l(j \to i,u)\}_{j \epsilon S_u, j \neq i}$ and $\{r_l(j \to i,u)\}_{j \epsilon S_u, j \neq i}$ may be use to keep track of poison, antidote request, and antidote, respectively, on link l associated with the poisoning of user l's data by other users in $S_u$. For convenience, values are set as $p_l(.) \leq 0$, $q_l(.) \leq 0$ and $r_l(.) \geq 0$, and the corresponding absolute values denote respectively the amount of poisoned information, antidote request, and antidote. That is, $p_l(i,u)=-1$ means that due to the coding event u, there is a flow of 1 bit of information from source node i transmitted over link l which is poisoned by all the other sources in $S_u$. Given a network coding event set U, for the network G' where the capacity of link l is $c_l$, if $$\sum_{l \in O(n)} x_l^j - \sum_{l \in I(n)} x_l^j \begin{cases} R_i, & \text{if } n = s_i, \\ -R_i, & \text{if } n = d_i, \\ 0, & \text{otherwise,} \end{cases}$$

and the conditions discussed hereinafter are satisfied, then the rate triples $(s_i, d_i, R_i)$ for $i=1, 2, \ldots, T$ are feasible with U, and the corresponding p(.), q(.) and r(.) represent a particular network coding solution.

For all $u_k \epsilon U$ and $i,j \epsilon S_{u_k}$:

$$p_l(i,u_k)=p_l(j,u_k) \text{ if } l \epsilon \Gamma_O(n_{u_k}).$$

For all $n \epsilon N'$, $u_k \epsilon U$, and $i,j \epsilon S_{u_k}$:

$$\sum_{l \in \Gamma_I(n)} p_l(i, u_k) - \sum_{l \in \Gamma_O(n)} p_l(i, u_k) \begin{cases} \geq 0 & \text{if } n = n_{uk} \\ \leq 0 & \text{otherwise} \end{cases},$$

$$\sum_{l \in \Gamma_I(n)} q_l(j \to i, u_k) - \sum_{l \in \Gamma_O(n)} q_l(j \to i, u_k) \begin{cases} \geq 0 & \text{if } n = n_{uk} \\ \leq 0 & \text{otherwise} \end{cases}, \text{ and}$$

$$\sum_{l \in \Gamma_I(n)} p_l(i, u_k) + q_l(j \to i, u_k) + r_l(j \to i, u_k)$$

$$= \sum_{l \in \Gamma_O(n)} p_l(i, u_k) + q_l(j \to i, u_k) + r_l(j \to i, u_k).$$

Let $T_{uk}$ be the number of elements in $S_{uk}$. At every link $l \epsilon \epsilon'$:

$$\underbrace{\sum_{i=1}^{T} x_l^i}_{f_l^x} + \underbrace{\sum_{u_k} \sum_{j: j \in S_{u_k}} \max_{i: i \in S_{u_k}, i \neq j} r_l(j \to i, u_k)}_{f_l^r} +$$

$$\underbrace{\sum_{u_k} (T_{u_k} - 1) \max_{i: i \in S_{u_k}} p_l(i, u_k) = f_l \leq c_l}_{-f_l^p}.$$

At every link l and $i \epsilon S$:

$$x_l(i) + \sum_{u_k: i \in S_{u_k}} p_l(i, u_k) + \min_{j \in S_{u_k}, j \neq i} q_l(j \to i, u_k) \geq 0.$$

If the conditions specified in these constraints are satisfied, then the rate triples $(s_i, d_i, R_i)$ for $i=1, 2, \ldots, T$ are feasible with network coding scheme U, and the only operations involved are duplication, routing, pseudo-broadcasting and bit-level XOR.

In networks in which network coding as described herein is performed, coding might introduce extra decoding delay which will affect the upper layer TCP/IP performance. For example, if binary coding over $b_1$ and $b_2$ is performed, the receiver (e.g., physical nodes 206, 208, 210, etc.) needs to have both the coded bit $b_1 \oplus b_2$ and $b_2$ in order to recover $b_1$. Should it take more time for $b_2$ to reach the receiver than the coded bit $b_1 \oplus b_2$, the receiver needs to wait and cannot send back an acknowledgement (e.g., an ACK). This may increase the possibility of making the sender (e.g., nodes 202 and/or 204) reduce its transmission speed and hence might significantly decrease the network throughput. To prevent this delay constraints may be imposed on the network code construction formulation, so extra decoding delay may be eliminated and there is no need to modify the upper-layer TCP/IP protocol.

Network 200 may have a known delay over link l, $T_l$. For coding event $u_k$, the poisoning event $j \to i$. The information from j will go through two virtual pipes, the first along the links with nonzero antidote-request participating in the coding event $u_k$ at node $n_{uk}$ and then along the links with nonzero poison and ending at some decoding node (e.g., a drain, an intermediate node, etc.). A second stream denotes the antidote flow and also ends at the same decoding node. The total delay for the antidote-request/poison stream is $$-\sum_l (p_l(i, u_k) + q_l(j \to i, u_k)) T_l$$

and the total delay of the antidote $j \to l$ is $$\sum_l r_l(j \to i, u_k) \tau_l.$$

Accordingly, for all $u_k$ and $i \epsilon S_{u_k}$:

$$\sum_l r_l(j \to i, u_k) \tau_l \leq -\sum_l (p_l(i, u_k) + q_l(j \to i, u_k)) \tau_l,$$

$\forall j \in Su_k$, $j \neq i$ and the antidotes will arrive earlier than the poisoned information at the decoding node. Thus, if a network coding solution satisfies this constraint as well as those described above, there will be no additional decoding delay.

To characterize the convex region C in the optimization formulation of method step 304 for the network $G'=(N', \epsilon')$, communication models of multi-radio/multi-channel networks are used. Physical-layer and MAC-layer issues such as wireless resource allocation, power control, interference management, transmission scheduling and medium access schemes as are known may be used.

To account for interference and power control, $H_{l,k}$ denotes the effective power loss between the transmitter (e.g., physical nodes 202, 204, etc.) of the $l^{th}$ link and the receiver (e.g., physical nodes 206, 208, 210, etc.) of the $k^{th}$ link, where $l \in \epsilon'$ and $k \in \epsilon$. Assuming the value of $H_{l,k}$ is determined by the $\beta^{th}$ power path-loss law: $H_{l,k} = G_{l,k} d_{l,k}^{-\beta}$, where $d_{l,k}$ is the distance between the start node of the $l^{th}$ link and the end node of the kth link, $\beta$ is the path-loss exponent, and $G_{l,k}$ is a constant representing the radio propagation properties of the wireless environment and other physical-layer effects.

In the physical layer (e.g., in a transmission model), each radio in the network (e.g., networks 100, 200, etc.) may only transmit or receive at any moment in time. Accordingly, the medium access (e.g. MA) of a multi-radio/multi-channel network may be constrained (e.g., as a further constraint to the optimization problem of method 300) according to the following constraints:

Since each radio in the network (e.g., networks 100, 200, etc.) may only transmit or receive at any moment in time, a primary conflict constraint $$a_{n,m} = \sum_{l \in O(n)} v_{l,m} + \sum_{l \in I(n)} v_{l,m}, a_{n,m} \leq 1, \forall n, m$$

is used. Additionally, the total number of channels accessed by a node is bounded by the number of radios in that node. That is, each node as described above may have multiple radios (e.g., transmitters, antennas, etc.) and a radio conflict constraint $$\sum_{m=1}^{M} a_{n,m} \leq I_n, n \in N,$$

where $I_n$ is the available radio number at node n, is used.

Furthermore, a transmission over a link may be corrupted by other nodes in case that the signal-to-interference-plus-noise ratio (SINR) for the link is smaller than its target SINR, a situation which is called the transmission conflict. For $l \in \epsilon$, in order to avoid a transmission conflict over the $m^{th}$ channel, $$\frac{H_{l,l}Pl,m + (1 - v_{l,m})}{\sigma_l^2 + \sum_{j \neq l} H_{l,j}Pj,m} > \gamma_{l,m}^t,$$

where $j \in \epsilon'$ and $Z_l$ is a constant large enough to guarantee $$z_l > \gamma_{l,m}^t \left( \sigma_l^2 + \sum_{j \neq l} H_{l,j}Pj,max \right).$$

In case that the $l^{th}$ link is activated at the $m^{th}$ channel, $v_{l,m}=1$ and $$\frac{H_{l,l}Pl,m + (1 - v_{l,m})}{\sigma_l^2 + \sum_{j \neq l} H_{l,j}Pj,m} > \gamma_{l,m}^t,$$

states that the SINR of the $l_{th}$ link should be greater than the target SINR $\gamma_{l,m}^t$. In case the link is not activated, $v_{l,m}=0$ and $$\frac{H_{l,l}Pl,m + (1 - v_{l,m})}{\sigma_l^2 + \sum_{j \neq l} H_{l,j}Pj,m} > \gamma_{l,m}^t,$$

always holds.

In the links (e.g., data links, etc.) associated with a virtual node n' (e.g., virtual node 224, 226, etc.), let $l' \in I(n')$ and $k' \in O(n')$. Also let l be the link (e.g., link 212, 214, 26, 218, etc.) which has the same start node as l' and end node as k'. In this way, $$\frac{H_{l,l}Pl',m + (1 - v_{l',m}v_{k',m})Z_{l,l'}}{\sigma_l^2 + \sum_{j \neq l} H_{l,j}Pj,m} > \gamma_{l',m}^t,$$

$\forall k' \in O(n')$ where $j \in \epsilon'$ and $Z_{l,l'}$ is a constant large enough to guarantee $$z_l, l' > \gamma_{l,m}^t \left( \sigma_l^2 + \sum_{j \neq l} H_{l,j}Pj,max \right).$$

When $v_{l',m}v_{k',m}=1$, a virtual broadcasting path is established along link l, and $$\frac{H_{l,l}Pl',m + (1 - v_{l',m}v_{k',m})Z_{l,l'}}{\sigma_l^2 + \sum_{j \neq l} H_{l,j}Pj,m} > \gamma_{l',m}^t,$$

$\forall k' \in O(n')$ ensures that the SINR of this path is larger than the target SINR. The capacity of the activated virtual links associated with the virtual node n' is determined by $\gamma_{l,m}^t$. To avoid transmission conflict, the total power of a node should be less than $P_{n,max}$. That is, $$\sum_{l \in O(n)} \sum_m Pl, m \leq P_{n,max}, \forall n \in N.$$

The capacity of the $l^{th}$ link is given by $$c_l = \sum_{m=1}^{M} c_{l,m}^t,$$

and the convex set C (described above) is a convex hull of $\{\underline{c} | \underline{c}$ satisfies the constraints $$a_{n,m} = \sum_{l \in O(n)} v_{l,m} + \sum_{l \in I(n)} v_{l,m},$$

$$a_{n,m} \leq 1, \forall n, m,$$

$$\sum_{m=1}^{M} a_{n,m} \leq I_n, n \in N,$$

$$\frac{H_{l,lPl,m} + (1 - v_{l,m})}{\sigma_l^2 + \sum_{j \neq l} H_{l,jPj,m}} > \gamma_{l,m}^t,$$

$$\frac{H_{l,lPl',m} + (1 - v_{l',m}v_{k',m})Z_{l,l'}}{\sigma_l^2 + \sum_{j \neq l} H_{l,jPj,m}} > \gamma_{l',m}^t,$$

$$\forall k' \in O(n'), \sum_{l \in O(n)} \sum_{m} Pl, m \leq P_{n,max}, \forall n \in N.\}.$$

Thus, the optimization problem described above in method 300 may be reformulated as $$\max \sum_{l=1}^{L'} \lambda_l c_l,$$

such that $\underline{c}$ satisfies the constraints $$a_{n,m} = \sum_{l \in O(n)} v_{l,m} + \sum_{l \in I(n)} v_{l,m},$$

$$a_{n,m} \leq 1, \forall n, m,$$

$$\sum_{m=1}^{M} a_{n,m} \leq I_n, n \in N,$$

$$\frac{H_{l,lPl,m} + (1 - v_{l,m})}{\sigma_l^2 + \sum_{j \neq l} H_{l,jPj,m}} > \gamma_{l,m}^t,$$

$$\frac{H_{l,lPl',m} + (1 - v_{l',m}v_{k',m})Z_{l,l'}}{\sigma_l^2 + \sum_{j \neq l} H_{l,jPj,m}} > \gamma_{l',m}^t,$$

$$\forall k' \in O(n'), \sum_{l \in O(n)} \sum_{m} Pl, m \leq P_{n,max}, \forall n \in N.$$

One or more wireless mesh networks, each having multiple transmission sources (e.g., multiple radios, transmitters, antennas, etc.) may be designed and/or implemented according to the methods described herein. That is, an optimization problem describing such a network may be formulated and solved. In other words, a network may be designed and the throughput of such a network may be optimized. In at least one embodiment, the optimization problem may be solved according to a primal-dual method with column generation. The designed network may be constructed and transmission may be sent using the network code designed for such a network.

Figure 5:
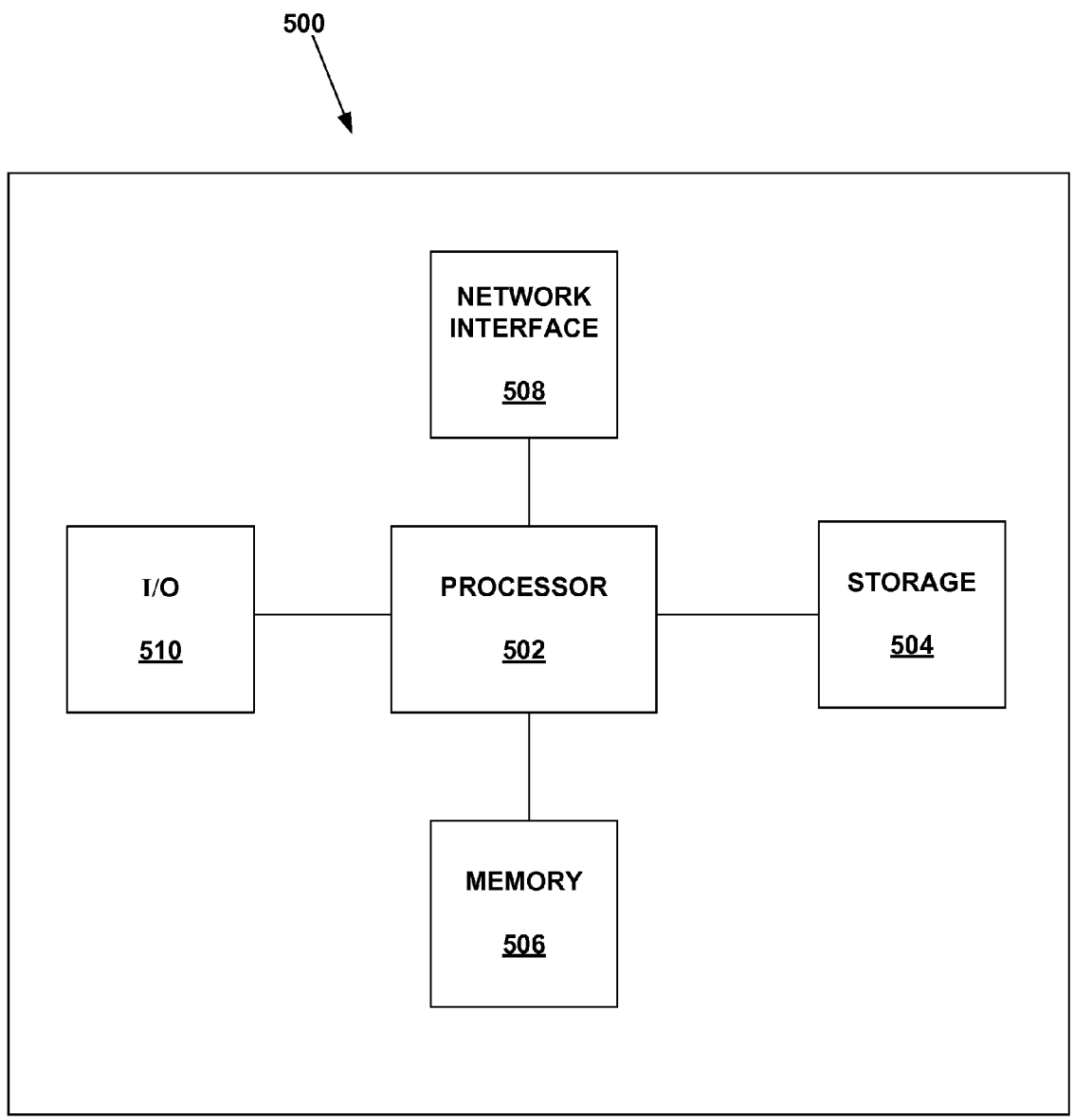
FIG. 5 is a schematic drawing of a controller.

FIG. 5 is a schematic drawing of a controller 500 according to an embodiment of the invention. Controller 500 contains a processor 502 which controls the overall operation of the controller 500 by executing computer program instructions which define such operation. The computer program instructions may be stored in a storage device 504 (e.g., magnetic disk, database, etc.) and loaded into memory 506 when execution of the computer program instructions is desired. Thus, applications for performing the herein-described method steps, such as network coding, transmitting data, and throughput optimization, in methods 300 and 400 are defined by the computer program instructions stored in the memory 506 and/or storage 504 and controlled by the processor 502 executing the computer program instructions. The controller 500 may also include one or more network interfaces 508 for communicating with other devices via a network (e.g., a peer to peer network, etc.). The controller 500 also includes input/output devices 510 (e.g., display, keyboard, mouse, speakers, buttons, etc.) that enable user interaction with the controller 500. Controller 500 and/or processor 502 may include one or more central processing units, read only memory (ROM) devices and/or random access memory (RAM) devices. One skilled in the art will recognize that an implementation of an actual controller could contain other components as well, and that the controller of FIG. 5 is a high level representation of some of the components of such a controller for illustrative purposes.

According to some embodiments of the present invention, instructions of a program (e.g., controller software) may be read into memory 506, such as from a ROM device to a RAM device or from a LAN adapter to a RAM device. Execution of sequences of the instructions in the program may cause the controller 500 to perform one or more of the method steps described herein, such as those described above with respect to methods 300 and 400. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 506 may store the software for the controller 500, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:
1. An apparatus for designing a wireless mesh network having a plurality of transmission sources and a plurality of nodes configured to communicate over a plurality of links, the apparatus comprising:
  means for determining an optimization problem describing the wireless mesh network, wherein the optimization problem is a utility function maxU(R,f) wherein R are unicast data rates and f are network flow rates;
  means for determining a plurality of constraints for the optimization problem, wherein the plurality of constraints for the optimization problem comprises: f∈F(R), $r_i \geq 0$, $\forall i$, c∈C(I), and $f_l \leq c_l$, $\forall l$ wherein:
    f∈F(R) enforces the dependence between the achievable rates R and the data flows f;
    $r_i \geq 0$, $\forall i$ is a data rate;
    c∈C(I) is the relationship between the achievable link capacity c and transmission source allocation; and
    $f_l \leq c_l$, $\forall l$ bounds a sum of the flow rate on each link by a link capacity; and
  means for determining a network code for the wireless mesh network by solving the optimization problem using a column-based primal-dual optimization method, wherein delay constraints are imposed on the network code to constrain the optimization problem, the delay constraints providing a transmission scheme in which antidotes are received at a decoding node prior to poisoned data.

2. The apparatus of claim 1 wherein the means for solving the optimization problem using a column-based primal-dual optimization method comprises:
  means for generating a set V' comprising one or more feasible link rates $c_k$ wherein V'=$\{c_k \in C\}_{k=1}^{K}$ and K is the number of feasible link capacity vectors;
  means for approximating C with $C' \subseteq C$ wherein $$C' = \left\{ \underline{c} \mid \underline{c} = \sum_{k=1}^{K} \alpha_k \underline{c}_k, \text{ s.t.} \sum_{k=1}^{K} \alpha_k = 1, \alpha_k \geq 0, \forall k \right\};$$

means for determining a lower bound of the optimization problem which is a solution to the optimization problem;
  means for determining one or more dual factors $\{\lambda_l\}_{l=1}^{L'}$ wherein L is the set of links connecting the plurality of nodes;
  means for determining an upper bound of the optimization problem wherein the upper bound is $$\max_{r_i \geq 0, \forall i} \left\{ U(\underline{R}, \underline{f}) - \sum_{l=1}^{L'} \lambda_l f_l \mid \underline{f} \in F(\underline{R}) \right\} + \max_{\underline{c} \in C} \sum_{l=1}^{L'} \lambda_l c_l$$

and wherein the dual factors $\{\lambda_l\}_{l=1}^{L'}$ are the corresponding Lagrangian multipliers associated with the constraints about $\{c_l\}$ in the optimization problem.

3. An apparatus for designing a wireless mesh network having a plurality of transmission sources and a plurality of nodes configured to communicate over a plurality of links, the apparatus comprising:
  means for determining an optimization problem describing the wireless mesh network, wherein the optimization problem is $$\max \sum_{l=1}^{L'} \lambda_l c_l$$

and further wherein L is the set of links over which the plurality of nodes are configured to communicate, c is an achievable link capacity, and λ is dual factor;
  means for determining a plurality of constraints for the optimization problem, wherein the plurality of constraints for the optimization problem comprises:

$$a_{n,m} = \sum_{l \in O(n)} v_{l,m} + \sum_{l \in I(n)} v_{l,m} a_{n,m} \leq 1, \forall n, m;$$

$$\sum_{m=1}^{M} a_{n,m} \leq I_n, n \in N;$$

$$\frac{H_{l,l}Pl,m + (1 - v_{l,m})}{\sigma_l^2 + \sum_{j \neq l} H_{l,j}Pj,m} > \gamma_{l,m}^t;$$

$$\frac{H_{l,l}Pl',m + (1 - v_{l',m} v_{k',m}) Z_{l,l'}}{\sigma_l^2 + \sum_{j \neq l} H_{l,j}Pj,m} > \gamma_{l,m}^t, \forall k' \in O(n'); \text{ and}$$

$$\sum_{l \in O(n)} \sum_{m} Pl, m \leq P_{n,max}, \forall n \in N, \text{ wherein:}$$

m is a channel, I is a link, $a_{n,m}$ and $v_{l,m}$ are indicator variables, H is an effective power loss, P is a transmission power over a link, K is a number of feasible link capacity vectors, γ is a target signal-to-interference-plus-noise ratio, and Z is a constant large enough to guarantee $$z_l, l' > \gamma_{l,m}^t \left( \sigma_l^2 + \sum_{j \neq l} H_{l,j}Pj,max \right); \text{ and}$$

means for determining a network code for the wireless mesh network by solving the optimization problem using a column-based primal-dual optimization method, wherein delay constraints are imposed on the network code to constrain the optimization problem, the delay constraints providing a transmission scheme in which antidotes are received at a decoding node prior to poisoned data.

* * * * *